United States Patent [19]
Mirsberger et al.

[11] Patent Number: 4,566,832
[45] Date of Patent: Jan. 28, 1986

[54] SLEEVE-SHAPED EXPANSION DOWEL

[75] Inventors: Helmut Mirsberger, Munich; Franz Popp, Puchheim, both of Fed. Rep. of Germany

[73] Assignee: Hilti Aktiengesellschaft, Schaan, Liechtenstein

[21] Appl. No.: 550,239

[22] Filed: Nov. 8, 1983

[30] Foreign Application Priority Data

Nov. 10, 1982 [DE] Fed. Rep. of Germany ....... 3241596

[51] Int. Cl.⁴ .............................................. F16B 13/04
[52] U.S. Cl. ........................................ 411/21; 411/33; 411/57
[58] Field of Search ..................................... 411/21–28, 411/32, 33, 39–42, 44, 45, 49, 50, 54–60, 62, 75

[56] References Cited

U.S. PATENT DOCUMENTS

| | | | |
|---|---|---|---|
| 843,271 | 2/1907 | Hanlon | 411/21 |
| 1,021,794 | 4/1912 | Pleister | 411/21 |
| 3,269,251 | 8/1966 | Bass | 411/21 |
| 3,516,324 | 6/1970 | Berner | 411/57 X |

FOREIGN PATENT DOCUMENTS

| | | | |
|---|---|---|---|
| 148882 | 3/1937 | Austria | 411/21 |
| 1936360 | 5/1970 | Fed. Rep. of Germany | 411/21 |
| 3017108 | 11/1981 | Fed. Rep. of Germany | 411/21 |
| 457981 | 8/1968 | Switzerland . | |

*Primary Examiner*—Thomas J. Holko
*Attorney, Agent, or Firm*—Toren, McGeady, Stanger, Goldberg & Kiel

[57] ABSTRACT

An expansion dowel is formed of an axially elongated sleeve with expansion tongues connected to it so that they can be pivoted radially outwardly projecting from the outside surface of the sleeve. Each of the tongues has a radially directed projection in the unexpanded position with the projection having a dimension transverse to the axial direction of the sleeve greater than the sleeve thickness. To provide an anchoring effect, the tongues can be displaced radially outwardly from the sleeve by an expanding member movable through the borehole formed by the sleeve. In the radially outwardly pivoted position the tongues interlock. Webs connected to the tongues provide an articulated connection between the tongue and the sleeve. The pivot axis formed by the webs extend normal to the axis of the sleeve.

5 Claims, 4 Drawing Figures

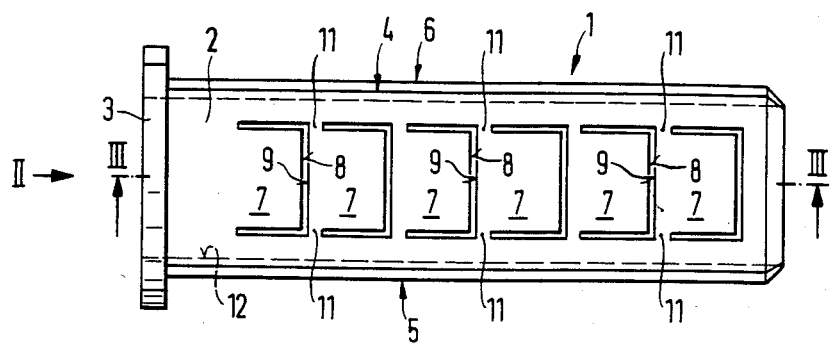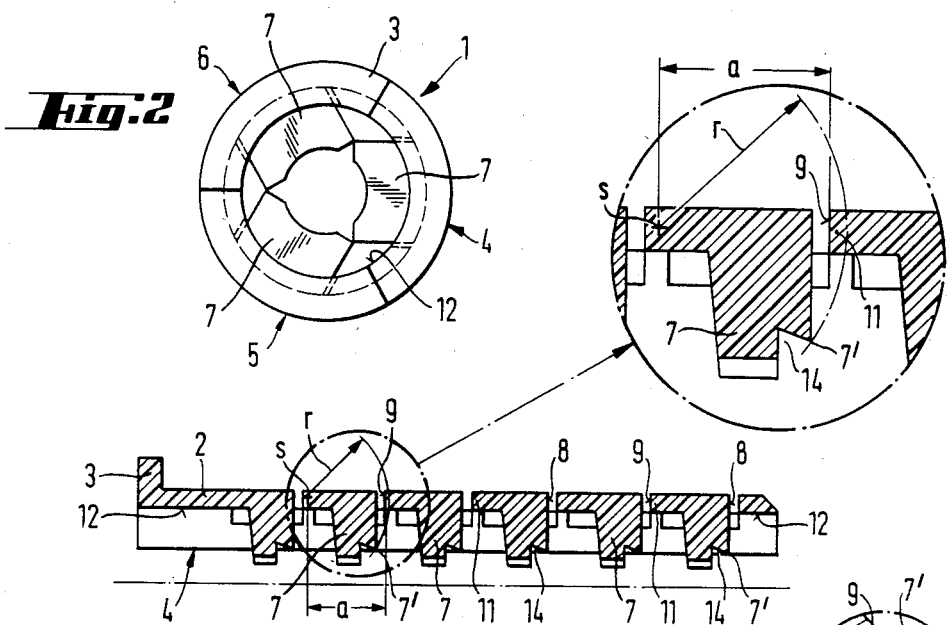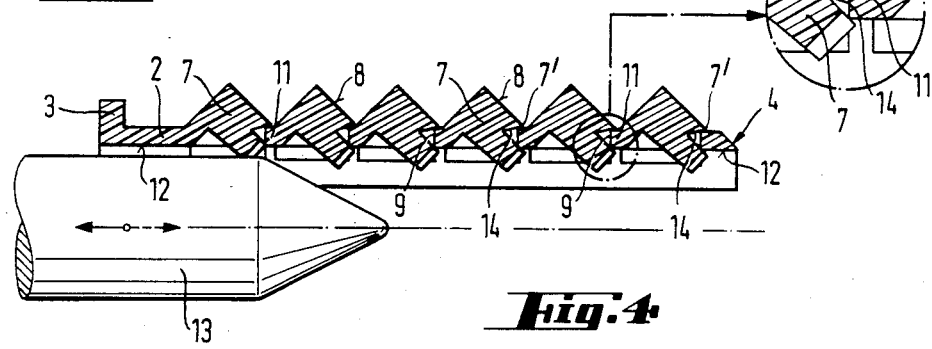

SLEEVE-SHAPED EXPANSION DOWEL

SUMMARY OF THE INVENTION

The present invention is directed to a sleeve-shaped expansion dowel with expansion tongues formed in the sleeve which can be pivoted radially outwardly by an expanding member. The tongues are articulated to the sleeve and are arranged in series one following the other. Each tongue has a free end and a radially extending projection is formed on the inside surface of the tongue and at the location of the radial extension the tongue has a radial dimension greater than the thickness of the sleeve. Accordingly, the tongues, because of the projections, extend into the borehole formed by the sleeve in the unexpanded position of the dowel by an amount based on the difference in the wall thickness of the sleeve and the radial dimension of the tongues at the projections.

An expansion dowel of this type can be used in solid material as well as in a material having interior hollow chambers, such as brickwork. The extent of the anchoring value is determined, independently of the type of material into which the dowel is anchored, based on the number of expansion tongues which engage the material into which the dowel is set. In other words, the anchorage value increases with an increased number of expansion tongues acting as supporting parts in the material into which the dowel is anchored.

In a known expansion dowel, the expansion tongues are arranged in series spaced axially apart and they are separated from the sleeve by strip-like parts. The expansion tongues are articulated at one side of the strip-like parts on the sleeve. The expansion tongues are displaced radially by an expansion member in the form of a pin, a drive screw, a hollow screw or the like, and the tongues can be locked in a radially outwardly displaced position by catches provided by teeth. The spacing between the expansion tongues is relatively great due to their articulated arrangement, with the result that only a relatively small number of expansion tongues can be arranged in series in the axial direction of the sleeve. Accordingly, the anchoring value of such an expansion dowel is unsatisfactory.

It is the primary object of the present invention to provide an expansion dowel with expansion tongues that can be pivoted radially outwardly from a sleeve and this expansion dowel is distinguished by its ability to achieve high anchoring values.

In accordance with the present invention, the expansion tongues are articulated to a sleeve along one side of the tongues by webs which permit the tongues to pivot about turning axes extending normal to the dowel axis.

By means of the invention, the strip-like parts of the sleeve arranged axially between the expansion tongues in the prior art arrangement can be eliminated due to the pivotal arrangement of the tongues. The sleeve surfaces between the expansion tongues, such as those which result in the known expansion dowel because of the strip-like parts, which extend in the axial direction of the dowel, can also be dispensed with. Accordingly, utilizing the present invention, a substantially larger number of expansion tongues can be arranged in series, that is, in an axially extending row.

In one possible embodiment of the expansion dowel, the expansion tongues can project outwardly from the sleeve by an amount determined by the radial difference between the sleeve thickness and the overall thickness of the tongue, before the dowel is placed into a receiving opening or borehole. When the dowel is inserted into the receiving opening, which corresponds to the outside diameter of the sleeve, the expansion tongues are pivoted into the borehole formed by the sleeve against the force biasing the tongues in the outward direction. The expansion tongues, when they are finally located in the area of hollow chambers in the material receiving the dowel, automatically pivot outwardly again due to the biasing force thereby affording a back-gripping, form-locking anchorage. The expanded member which is inserted into the borehole subsequently, serves as a locking element for the expansion tongues and prevents them from being pivoted inwardly.

In another embodiment of the expansion dowel, the expansion tongues can project into the borehole formed by the sleeve before the dowel is inserted into a receiving opening. After insertion, an expansion member is driven into the sleeve so that the expansion tongues pivot outwardly from the sleeve by an amount determined by the difference in wall thickness between the sleeve and the tongues. The outwardly pivoted movement is effected against the force retaining the tongues in position within the sleeve, and this force causes the tongues to swivel automatically back into the borehole in the sleeve when the expansion element is removed.

High anchoring values are achieved by a deep, form-locking engagement of the expansion tongues in a relatively soft anchoring material as well as in anchoring material containing hollow chambers. Accordingly, it is necessary to pivot the expansion tongues as far outwardly as possible and this is achieved preferably by locating the pivot axes at the trailing end of the tongues relative to the insertion direction.

In a preferred embodiment of the invention, the pivot axes are formed by webs connected with the sleeve and the expansion tongues so that a unit is formed. Such webs permit the tongues to be pivoted and also to experience a slight offsetting action in the axial direction of the sleeve which offsetting action is advantageous for effecting a locking action of adjacent tongues. Moreover, in this embodiment, the above mentioned automatic return of the expansion tongues to the original position is ensured.

Preferably, the expansion dowel is produced from a plastics material. For reasons of assembly the dowel is made up of axially extending shell sections which are connected together to form the sleeve. The shell sections can be joined together by welding or by auxiliary mechanical means, such as rings.

A significant feature of the preferred embodiment is the maximum radial extension of the pivotal tongue which is greater than the distance between the pivoting axes of the tongues and the adjacent ends of the next expansion tongue in the insertion direction of the dowel, in other words, the dimension between the pivoting axis of one expansion tongue and the trailing end of the adjacent tongue closer to the leading end of the dowel. For effecting a locking engagement between adjacent expansion tongues, the free leading end of a tongue pivoted outwardly from the sleeve can be engaged with the trailing end of the adjacent tongue located closer to the leading end of the expansion dowel.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is an axially extending side view of an expansion dowel embodying the present invention and shown in the unexpanded position;

FIG. 2 is an end view of the expansion dowel taken in the direction of the arrow II in FIG. 1;

FIG. 3 is a partial sectional view of the expansion dowel taken along the line III—III in FIG. 1; and FIG. 4 is a sectional view similar to that shown in FIG. 3, however, with the expansion tongues pivoted outwardly by means of an expansion member.

DETAIL DESCRIPTION OF THE INVENTION

In FIG. 1 an expansion dowel is formed as an axially extending sleeve 1. As viewed in FIG. 1, the right-hand end of the sleeve is its leading end and the left-hand end is its trailing end, that is, when the sleeve is inserted into a borehole or receiving opening, the leading end is inserted first. The sleeve 1 is made up of an axially extending shaft 2 extending from the leading end to a head 3 at the trailing end. The head 3 is a flange-like member projecting radially outwardly from the outside surface of the shaft 2.

To simplify its production and assembly, the sleeve 1 is made up of three axially extending shell sections 4, 5, 6 welded together along their axially extending edges to provide the full sleeve cross-section. In other words, each shell section forms one-third of the circumferentially extending surface of the sleeve.

Each of the shell sections, 4, 5, 6 has a series or row of expansion tongues 7, note FIG. 1 illustrating one row of the tongues 7 formed in the shell section 4. Each tongue 7, corresponding to the sleeve 1, has a leading end closer to the leading end of the sleeve and a trailing end closer to the trailing end of the sleeve. Each leading end of the tongues 7 is a free end 8 facing in the insertion direction of the dowel and each tongue is pivotally articulated at the opposite end 9, that is, at the trailing end of the tongue, by a web 11. The webs 11 connect the tongues 7 to the remaining axially extending walls of the sleeve 1. In addition to the free leading end 8, each tongue is free along its two opposite axially extending sides extending in the direction toward the leading end of the dowel from the associated web 11. As can be seen in FIGS. 2 and 3, each tongue has a radially inwardly directed projection adjacent its leading end in the unexpanded position. The inward projection is greater than the wall thickness of the sleeve 1 so that the tongues 7 project inwardly into the borehole 12 formed by the sleeve in the unexpanded position displayed in FIGS. 1, 2, 3. As shown in FIG. 3, the pivoting radius r of the expansion tongues 7, that is, the radius extending between the pivot axis s and the edge 7' on the tongue is the maximum distance from the pivot axis. The pivoting radius r is greater than the distance a between the pivot axis s and the trailing end of the adjacent expansion tongue 7 closer to the leading end of the dowel. As illustrated in FIG. 3 the arc defined by the pivoting radius r intersects the trailing end part of the adjacent tongue in the direction toward the leading end of the dowel.

By inserting a pin-shaped expansion element 13 into the sleeve 1 from its trailing end toward its leading end, with the diameter of the expansion member corresponding approximately to the inside diameter of the sleeve borehole 12, the expansion tongues contacted by the expansion member are displaced radially outwardly pivoting about the pivot axes s. Due to the dimensional relationship, shown in FIG. 3, between the pivoting radius r and the distance a, at the termination of the outwardly pivoting movement a locking engagement takes place between the edge 7' on the expansion tongue 7 and the trailing end 9 of the next forward expansion tongue 7. As can be seen in FIG. 3, the edge 7' is spaced by the pivoting radius r from the pivot axis s. The locking engagement can be improved by means of a notch 14 formed in the projection of the expansion tongues 7 located radially inwardly of the edge 7' when the dowel is in the unexpanded position as displayed in FIG. 3.

In FIG. 4, showing the tongues 7 in the radially outwardly pivoted position, the notch 14 receives the trailing end 9 of the next forwardly adjacent tongue so that the desired locking engagement is effected.

After the locking engagement of the expansion tongues 7 in the expanded position of the dowel, as illustrated in FIG. 4, the expanding member 13 can be withdrawn from the sleeve and the anchoring of the dowel is maintained. In FIG. 4, the expansion member 13 is shown in a partly withdrawn position. Since each of the shell sections 4, 5, 6 have expansion tongues, note FIG. 2, a permanent anchoring takes place which is uniformly distributed around the circumference of the sleeve 1.

While specific embodiments of the invention have been shown and described in detail to illustrate the application of the inventive principles, it will be understood that the invention may be embodied otherwise without departing from such principles.

We claim:

1. A sleeve-shaped expansion dowel comprising an axially extending sleeve defining an axially extending borehole and said sleeve having a first end and a second end spaced apart in the axial direction, expansion tongues formed in and articulated to said sleeve and said tongues being pivotably displaceable from an unexpanded position relative to said sleeve radially outwardly from said sleeve into an expanded position by axially displacing an expanding member through the borehole in said sleeve, said tongues arranged in a row one immediately following the other in the axial direction of said sleeve, each said tongue having a first end and a second end spaced apart in the axial direction of said sleeve and the first end being free for radially outwardly displacement from said sleeve into the expanded position and the second end being closely adjacent to the first end of the next said tongue in said row, said tongues having an inside surface adjacent the second ends thereof in general alignment with the surface of the borehole in the sleeve and adjacent the first ends thereof having a projection extending radially inwardly from the inside surface into the borehole in said sleeve in the unexpanded position of said tongues, said expansion tongues are articulated to said sleeve at the second ends thereof and are pivotally displaceable about pivot axes extending normal of the axis of said sleeve, and said end of each said expansion tongue comprises a web connection said expansion tongue laterally thereof to said sleeve.

2. A sleeve-shaped expansion dowel, as set forth in claim 1, wherein the first end of said sleeve is the leading end which is inserted into a receiving borehole or opening first and said second end is the trailing end thereof, the first end of each said expansion tongue is the end thereof closer to the first end of said sleeve and the second end thereof is the end closer to the second end of said sleeve, and said pivot axes are located at the second ends of said expansion tongues.

3. A sleeve-shaped expansion dowel, as set forth in claim 2, wherein each said tongue has a pivoting radius extending from said pivot axis to a point on the surface on the first end of said tongue which is at the maximum distance from the pivot axis and which exceeds the distance from the pivot axis to the second end of the next adjacent tongue in the direction toward the leading end of said sleeve.

4. A sleeve-shaped expansion dowel, as set forth in claim 3, wherein a recess is formed in the first end of each said expansion tongue adjacent the radially inner end thereof in the unexpanded position and said recess interlocks with the second end of the next adjacent said tongue in the direction toward the leading end of said sleeve when said tongue is pivotally displaced into the expanded position.

5. A sleeve-shaped expansion dowel, as set forth in claim 1, wherein the axially extending sides of said tongues extending from said web to the first end of said tongues are free of said sleeve.

* * * * *